United States Patent [19]

Frazier et al.

[11] 4,281,327

[45] Jul. 28, 1981

[54] RANGE CORRECTOR CIRCUIT FOR A BISTATIC PASSIVE RADAR DISPLAY

[75] Inventors: Lawrence M. Frazier, West Covina; William H. Johnson, Upland, both of Calif.

[73] Assignee: General Dynamics, Pomona Division, Pomona, Calif.

[21] Appl. No.: 103,327

[22] Filed: Dec. 14, 1979

[51] Int. Cl.³ .......................... G01S 13/16; G06G 7/78
[52] U.S. Cl. ..................................... 343/12 R; 343/15; 343/112 C; 343/112 D; 364/456
[58] Field of Search ................... 364/458, 456; 343/15, 343/12 R, 112 C, 112 D

[56] References Cited

U.S. PATENT DOCUMENTS

| | | | |
|---|---|---|---|
| 2,837,738 | 6/1958 | Van Valkenburgh | 364/456 X |
| 2,971,190 | 2/1961 | Busignies | 343/12 R X |
| 3,796,867 | 3/1974 | Abnett et al. | 343/112 C X |
| 4,173,760 | 11/1979 | Garrison | 343/15 X |

Primary Examiner—Malcolm F. Hubler
Attorney, Agent, or Firm—Neil F. Martin; Edward B. Johnson

[57] ABSTRACT

The range corrector circuit uses two counters, one for the apparent range ($R_a$) and one for the correct range ($R_c$), and a random access memory (RAM). The $R_c$ counter is continuously incremented linearly and the $R_a$ counter is incremented in accordance with a range correction equation. Both counters are reset to one every time a transmitter pulse is received. A linear sweep is also initiated on the plan position indicator (PPI) display of the bistatic passive radar at that time. Target returns are entered into the RAM at the address specified by the $R_c$ counter and are read out of the RAM and applied to the PPI display at the address specified by the $R_a$ counter.

6 Claims, 6 Drawing Figures

RANGE CORRECTOR CIRCUIT FOR A BISTATIC PASSIVE RADAR DISPLAY

BACKGROUND OF THE INVENTION

This invention relates to the display of bistatic passive radar systems. Ordinary (monostatic) radar systems have a transmitter and a receiver located at the same site. The transmitter emits pulses of electromagnetic radiation and the receiver detects reflected radiation from targets illuminated by the transmitter pulse. The range of the target is determined by the time it takes a pulse of a electromagnetic radiation to travel from the transmitter to the target and then by reflection from the target back to the receiver. The transmitter pulses are focused in a narrow beam, and the bearing of the target is determined by the bearing of the transmitter's antenna at the time the reflected pulse is received.

When used in military aircraft or ships, monostatic radar has the disadvantage that the transmitter can be detected at long range (hundreds of miles) by the electromagnetic pulses it emits. This allows the enemy to detect the presence of a ship or aircraft and also to determine its bearing. To get around this disadvantage, bistatic passive radar was developed. Bistatic passive radar does not have a transmitter but rather has two receivers which utilize the radiation emitted by any monostatic radar in its reception area. The transmitter of a monostatic radar system which is being used by a bistatic passive radar system is known as the host transmitter. The bistatic passive radar system locks onto the host transmitter's pulse train, measures the rotational speed of its antenna and its bearing angle, and generates a plan position indicator (PPI) display from this data. Target returns are displayed on the PPI display which has the host transmitter as its center.

In a monostatic radar system, the following relationship exists between the elapsed time for a target return and the target distance from the radar site:

$$\Delta t v = 2d$$

Where $\Delta t$ equals elapsed time in seconds for the transmitted pulse to reach the target and return, v equals velocity of propagation in feet per second, and d equals distance in feet from the target to the radar site.

This relationship is true for all targets detected by monostatic radar systems. However, for the bistatic passive radar system, this relationship is true only for special targets. The range of most targets on a bistatic passive PPI display are geometrically distorted. For example, signal returns from a target located on either side of a straight line between the host transmitter and the bistatic passive receiver would appear to be closer to this line than it would if the above equation is used. Therefore, there is some geometrical distortion to the PPI display on a bistatic passive radar if no provision is made to compensate for the separation distance between the host transmitter and the bistatic passive receiver.

In the past there have been several attempts to correct this display distortion. One of these used a hybrid digital/analog computer which generated a non-linear range sweep to properly position the target return on the PPI display. This approach was unsatisfactory because the analog circuits are subject to drift.

A full digital display corrector was used in which the target returns were stored in a memory as they were received and later retrieved for displaying at the correct time. However, this system required much hardware and power. The total chip package count was in excess of 100 units. The power requirement was in excess of 50 watts. The principal object of this invention is to provide a digital display corrector for bistatic passive radar displays which is simple in structure and requires only a small amount of power.

SUMMARY OF THE INVENTION

In accordance with this invention, a simple digital display corrector is provided by providing means for making an iterative solution of the basic corrector equation every micro second during a linear sweep that starts with receipt of a pulse from the host transmitter. The basic corrector equation is:

$$R_c = (R_a^2 + 2R_a D)/R_a + D(1 + \cos \phi)$$

Where $R_c$ equals the correct range from the host transmitter to the selected target; $R_a$ equals the apparent range from the host transmitter to the selected target; D equals the distance between the bistatic passive radar receiver and the host transmitter; and $\phi$ equals the angle between the extension of a line extending from the bistatic passive radar receiver through the host transmitter and a line extending from the host transmitter to the selected target.

Two counters are used to accumulate values for $R_c$ and $R_a$. The $R_c$ counter is continuously incremented linearly every micro second. The $R_a$ counter is incremented in such a way as to maintain the relationship of the basic corrector equation between the value and the $R_c$ counter and the value in the $R_a$ counter. Targets are entered into a random access memory (RAM) at addresses specified by the $R_c$ counter and are extracted from the RAM and applied to the PPI display at the addresses specified by the $R_a$ counter. The corrector circuit of this invention requires only 33 integrated circuit chips and only 2 Watts of power as compared with 100 chips in the prior art circuit and 50 Watts of power.

DESCRIPTION OF THE PREFERRED EMBODIMENT

Figure 1:
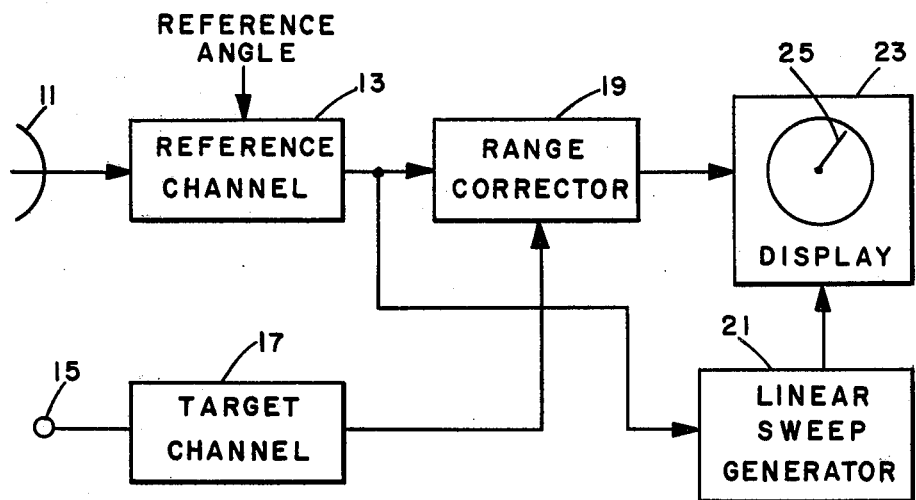
FIG. 1 is a block diagram of a bistatic passive radar system with a range corrector circuit.

FIG. 1 shows the basic elements of a bistatic passive radar system with a range corrector circuit. Signals from the host transmitter $T_x$ (FIG. 2) are picked up and tracked by a directional antenna 11 whose signals are amplified and processed in a reference channel 13. Reference channel 13 also measures the azimuth angle of the transmitter with respect to a reference angle, and measures the rotation rate of the transmitter's antenna, the angle $\phi$, (see FIG. 2), locks onto the transmitter's pulse train, and generates information for the plan position indicator (PPI) display sweep. Target signals are picked up by a omni-directional antenna 15 and are processed by target channel 17. Both the transmitter signals and the target signals are applied to range corrector circuit 19. A linear sweep generator 21 drives the PPI display circuit 23 in which a trace 25 is driven across the screen in synchronism with the sweep generator 21, which starts its sweep in response to receipt of a pulse from the host transmitter. Target returns are displayed by intensifying trace 25 at the time of the target return. The means for intensifying trace 25 are in display circuit 23.

Figure 2:
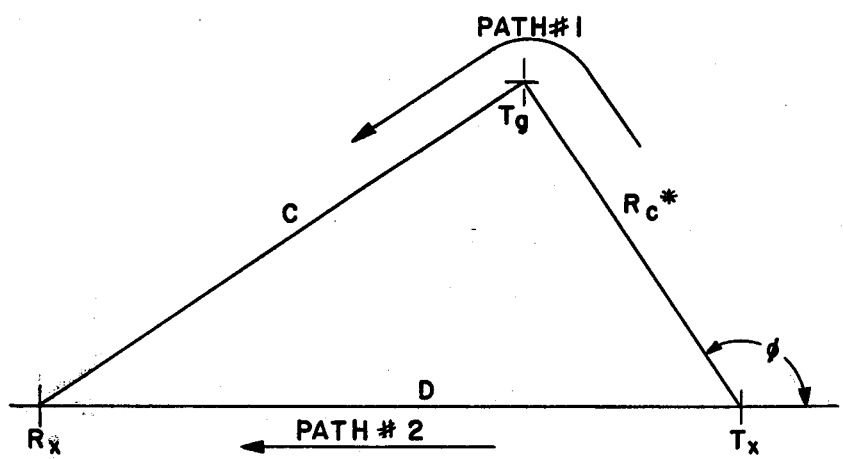
FIG. 2 shows the triangle formed by a bistatic passive radar system, its host transmitter, and the target.

FIG. 2 shows the geometrical relation between the bistatic passive receiver, the host transmitter and a target. The symbols and relationships used to derive the bistatic display corrector equation are shown in FIG. 2, where:

$R_x$ equals the location of the bistatic passive receiver;
$T_x$ equals the location of the host transmitter;
$T_g$ equals the target;
$R_c^*$ equals the distance from the host transmitter to the target;
D equals the distance from the host transmitter to the bistatic passive receiver;
C equals the distance from the target to the bistatic passive receiver;
$\phi$ equals the angle between a line from the bistatic passive receiver and the host transmitter extended and $R_c^*$.

The value D, the separation distance between the transmitter and receiver, is usually known. The value of the angle $\phi$ is also known once the scan rate of the host transmitter has been determined and azimuth lock has been achieved. This assumes a constant scan rate. The pulse of electromagnetic energy which travels from the transmitter $T_x$ to the receiver $R_x$ travels along the direct path number 2 in FIG. 2 while the reflected energy from the target travels around the compound path number 1. The apparent distance $R_a$ is the difference in lengths of path number 2 and path number 1 as follows:

$$R_a = R_c^* + C - D \qquad \text{(Equation 1)}$$

Distance C can be calculated from the law of cosines as follows:

$$C^2 = R_c^{*2} + D^2 - 2R_c^*[D \cos(180 - \phi)] \qquad \text{(Equation 2)}$$

Substituting equation #1 into equation #2 for C:

$$(R_a + D - R_c)^2 = (R_c^*)^2 + D^2 + 2R_c^* D \cos\phi \qquad \text{(equation #3)}$$

Expanding and rearranging gives the following form:

$$R_c^* = (R_a^2 + 2R_a D)/(2R_a + 2D(1 + \cos\phi)) \qquad \text{(equation #4)}$$

One further simplification can be made. The time required for the radar pulse to travel from the transmitter to a target and return to the receiver, as in the monostatic case, is equal to the velocity of propagation times twice the distance $R_c^*$. Hence, for the monostatic radar system:

$$R_c = 2R_c^* \qquad \text{(equation #5)}$$

substituting:

$$R_c = (R_a^2 + 2R_a D)/(R_a + D(1 + \cos\phi)) \qquad \text{(equation #6)}$$

This is the bistatic display corrector equation which is implemented in the display corrector circuit of this invention.

Before all methods of implementation can be considered, it is necessary to know the manner in which the corrected range $R_c$ varies with respect to the apparent range $R_a$. This can be understood by differentiating the correct range with respect to the apparent range. This yields:

$$(dR_c/dR_a) = 1 + [D \sin\phi/R_a + D(1 + \cos\phi)]^2 \qquad \text{(equation #7)}$$

Inspection of the above relationship reveals that the apparent range, $R_a$, never increases by an amount larger than the correct range $R_c$. This is necessary in the method used in the preferred embodiment of the invention.

Since the correct range value $R_c$ is always either equal to or greater than the apparent range, it is necessary that the display corrector provide some method to save or store the target returns as they are received in real time and output them to the video circuit at the correct time.

The change from distances to time is accomplished by dividing all distances by the velocity of propagation for the radar return.

Rearranging the bistatic display corrector equation as follows yield the form which is implemented in the corrector circuit of the preferred embodiment:

$$R_c = R_a^2 + 2R_a D/R_a + D(1 + \cos\phi) \qquad \text{(equation #6)}$$

rearranging:

$$R_a^2 + 2R_a D - R_c[R_a + D(1 + \cos\phi)] = 0 \qquad \text{(equation #8)}$$

let:

$$F(R_o, R_a) = D[2R_a - R_c(1 + \cos\phi)] + R_a^2 - R_a R_c \text{(equation 1909)}$$

Figure 3:
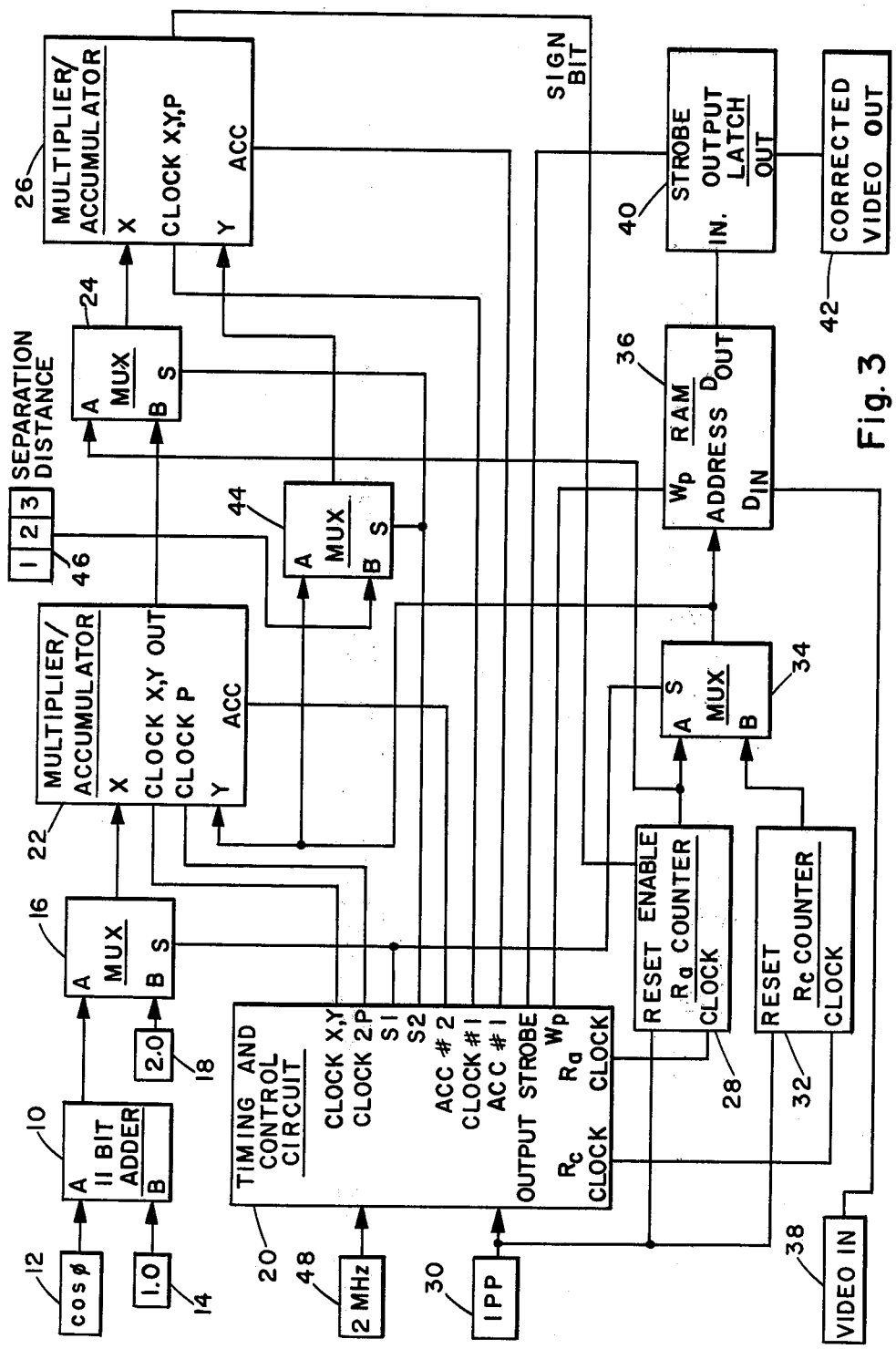
FIG. 3 is a block diagram of the preferred embodiment of the range corrector circuit of this invention.

FIG. 3 shows a hardware implementation of the above equation. It includes an 11 bit adder 10 which receives an input of $\cos\phi$ at 12 and an input of a fixed number 1 at 14 and performs the operation of adding the 1 to $\cos\phi$. The output of adder 10 is applied to the A input of a multiplexer 16 whose B input receives a fixed number 2 input from 18. The switch input of the multiplexer 16 is controlled by a timing signal from a timing and control circuit 20 which is explained hereinafter. The output of multiplexer 16 is applied to the X input of a multiplier/accumulator 22 whose output is applied through a second multiplexer 24 to a second multiplier/accumulator 26. Multiplier/accumulator 22 receives timing inputs from timing and control circuits 20 and also receives a Y input from another branch of the circuit which is described hereinafter. A $R_a$ counter 28 receives a clock input from timing and control circuit 20 and a reset pulse input from source 30, which is also applied to the reset of a $R_c$ counter 32. Counters 28 and 32 have their outputs applied to a multiplexer 34 whose output is applied to the address input of a random access memory 36. Random access memory 36 receives video input from source 38 and applies its video output to an output latch 40. The output of latch 40 constitutes the corrected video output 42 which is applied by means not shown to the PPI display of the bistatic passive radar. The output of multiplexer 34 is also applied to the Y input of multiplier/accumulator 22 and also to the A input of another multiplexer 44 whose output is applied to the Y input of the multiplier/accumulator 26. Multiplexer 44 at its B input receives a input for the value of distance D from source 46.

Before describing the detailed operation of the embodiment shown in FIG. 3, the essential features of its operating cycle will first be described. The operation starts with the receipt of an input pulse IPP from the host transmitter. The IPP pulse, which is designated as source 30 in FIG. 3, is used to reset both the $R_c$ counter 32 and the $R_a$ counter 28 to one. It also starts the operation of timing and control circuit 20 and initiates a linear PPI sweep (FIG. 1) on the bistatic passive radar (FIG. 1).

The $R_c$ counter 32 is then incremented linearly every micro second by the $R_c$ clock output of timing and control circuit 20, which is derived from a 2 MHZ clock input from source 48. Once each micro second, the output of counter $R_c$ is multiplexed into the address input of RAM 36 to store video input from source 38.

The $R_a$ counter 28 is also clocked once each micro second, but it will not increment unless it is enabled by a negative sign bit from the output of multiplier/accumulator 26. The sign bit of multiplier/accumulator 26 will not be negative unless the values of $R_c$ and $R_a$ satisfy equation #6. For this reason, the count of $R_a$ counter 28 will lag behind $R_c$ counter 32 by just enough to provide the correct address for the video output each micro second. Once each micro second, the output of $R_a$ counter 28 is multiplexed into the address input of RAM 36 to read out stored video pulses, which are applied to output latch 40 for transmission to the PPI display 23 (FIG. 1). The address selected by $R_a$ counter 28 puts the output video pulse at its correct position on the linear trace of the PPI display.

Figure 4:
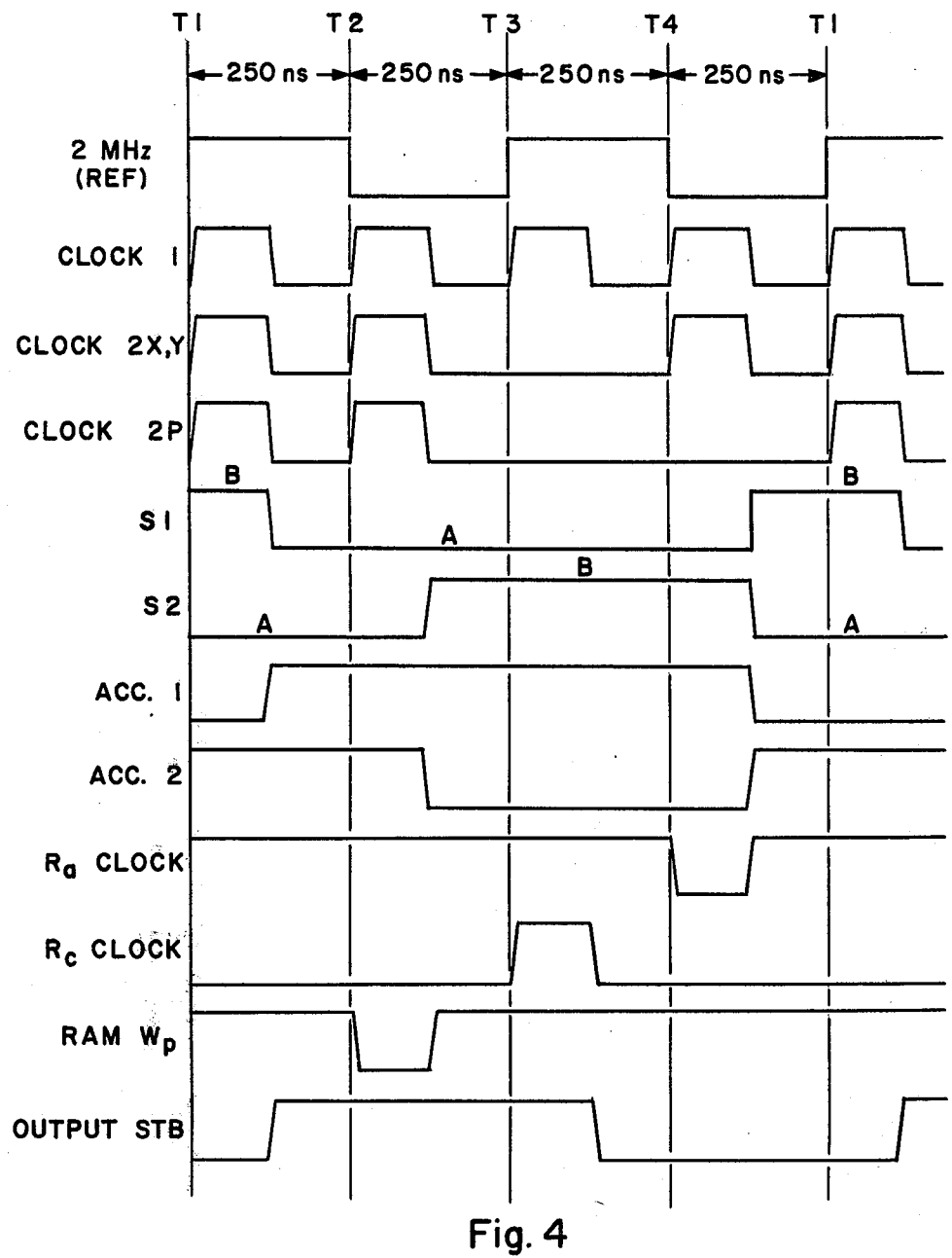
FIG. 4 is a set of wave forms illustrating the operation of the range corrector circuit of FIG. 3.
Figure 5:
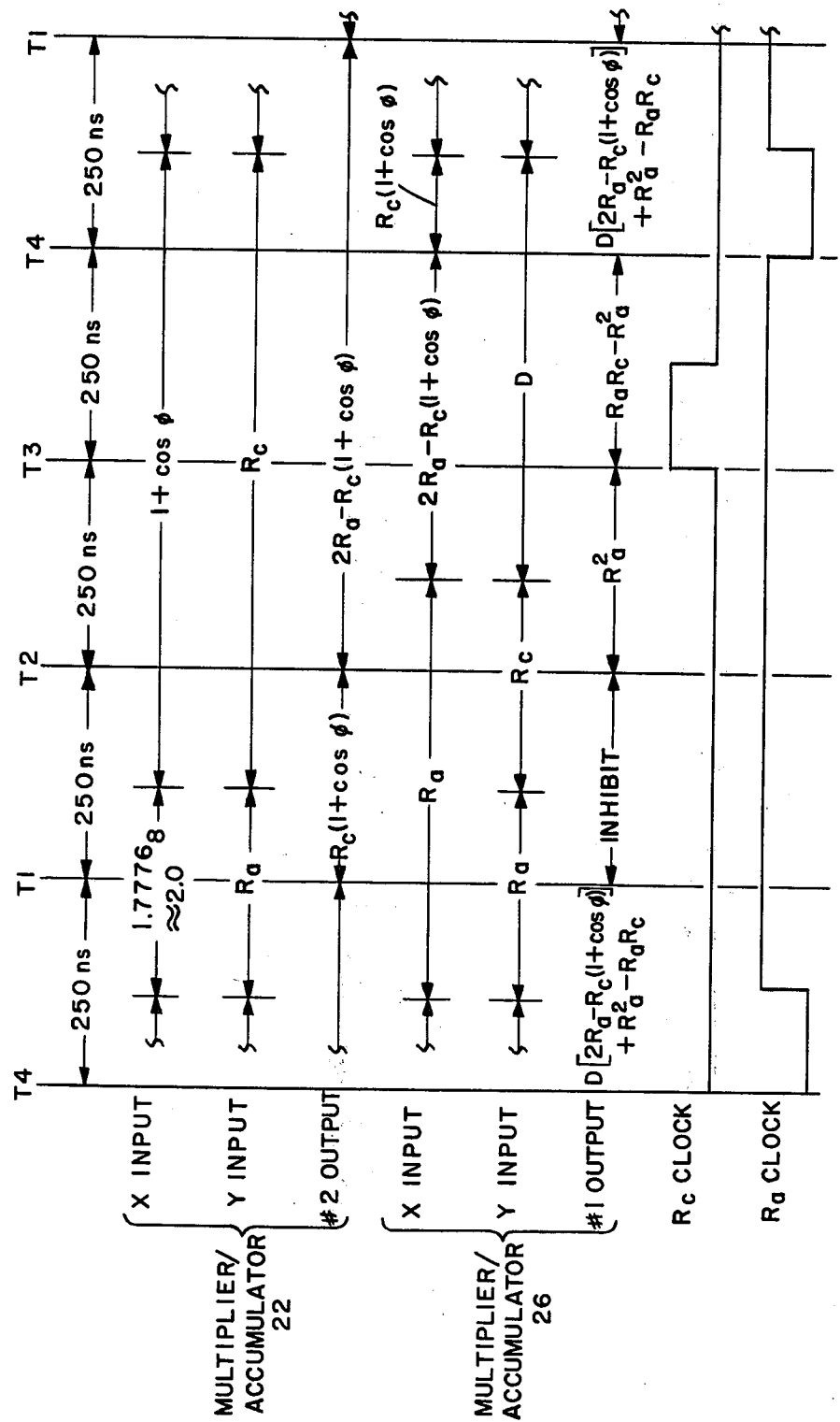
FIG. 5 is a timing event diagram for the range corrector circuit of FIG. 3.
Figure 6:
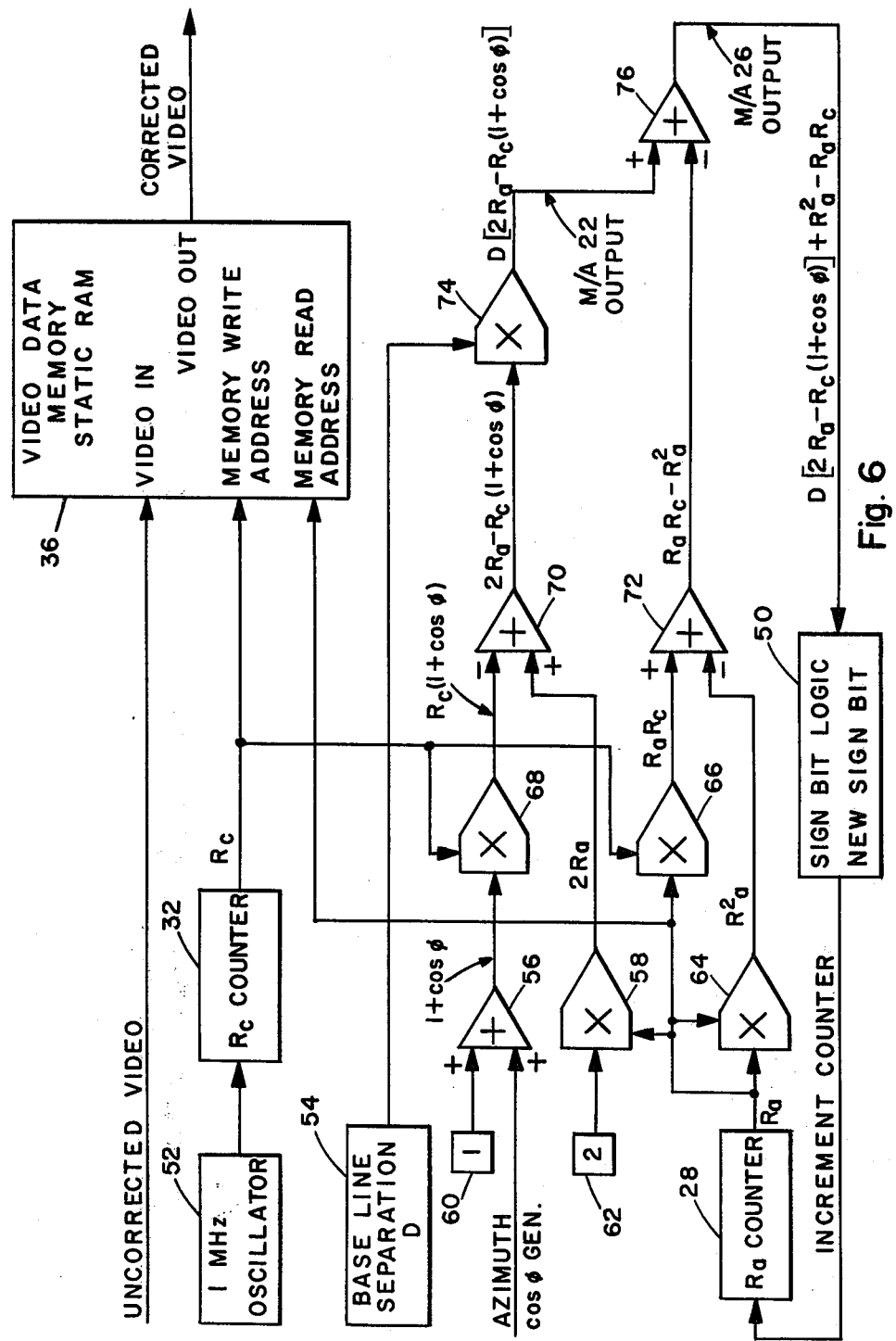
FIG. 6 is a functional diagram of the calculations made in the range corrector circuit of FIG. 3.

The calculation of equation #6 is performed each micro second by the remaining portions of the circuit as illustrated in detail in the timing charts of FIGS. 4 and 5 and the functional computation diagram of FIG. 6. As shown in the timing charts of FIGS. 4 and 5, each timing period of 1 micro second is divided into four 250 nanosecond timing periods. The computations which are performed in each 250 ns timing period are indicated in FIG. 5 along with the inputs required therefor. For example, referring to the timing slots for multiplier/accumulator 26, the value $R_a$ is entered on the X and Y inputs between the mid points of T4 and T1 and the value $R_a^2$ is computed between T2 and T3. The value $R_c$ is entered on the Y input between the mid-points of T1 and T2, with $R_a$ being on the X input during the same time interval. From these inputs the value $R_aR_c - R_a^2$ is calculated between T3 and T4. The $R_c$ counter 32 is clocked at T3 while the $R_a$ counter 28 is clocked between T4 and T1. It should be noted, however, that the $R_a$ counter 28 must be enabled by a negative sign bit from multiplier accumulator 26 to increment in response to its clock pulse.

FIG. 4 shows the control signals from timing and control circuit 20. The pulses initiate operation of the circuits to which they are coupled to perform the required computations.

The computation cycle proceeds as follows:

The sequence of events begins with $(1+\cos \phi)$ and $R_c$ being strobed into multiplier/accumulator 22 at time T4. At this time the previous computation is completed and available at the output of multiplier/accumulator 26. The sign bit of multiplier/accumulator 26 is sampled and $R_a$ counter 28 is incremented if the sign is negative.

At time T1, the count of $R_a$ counter 28 and the value 2.0 are strobed into multiplier/accumulator 22. Also at time T1 the count of $R_a$ counter 28 is strobed into both inputs of multiplier/accumulator 26.

At time T2, the value for the function $2R_a - R_c(1+\cos \phi)$ is strobed into the output latch of multiplier/accumulator 22. This value is held until time T4 when a new cycle begins. Also at time T2 the counts of both counters 28 and 32 are strobed into multiplier/accumulator 26.

At time T3 the value for the function $2R_a - R_c(1+\cos \phi)$ and the separation distance are strobed into multiplier/accumulator 26.

Following the output strobe at T4, the computed bistatic correction equation is available at the output of multiplier/accumulator 26.

The foregoing cycle is repeated every micro second during every sweep of the PPI display and produces the correct range for every target on the display.

Although only one RAM is used in this embodiment, it will be apparent that additional RAMs could be coupled in parallel to provide more than one intensity level for the displayed video.

FIG. 6 shows the above described calculation in functional form. Counters 28 and 32, RAM 36, sign bit logic 50, oscillator 52, and base line separation input 54 are hardware units, but the remaining blocks represent additions and multiplications that are performed by the hardware shown in FIG. 3. FIG. 6 shows that the above described calculation involves 4 additions and 5 multiplications which are achieved by the hardware of FIG. 3 with only two multiplier/accumulators, one adder, and three multiplexers. This simplicity in the hardware is an important feature of this invention.

Having described our invention, we now claim:

1. In a bistatic passive radar system including a directional antenna for receiving input pulses from a host transmitter, an omni-directional antenna for receiving reflected pulses from targets illuminated by said host transmitter, a plan position indicator (PPI) display, and a sweep generator for generating linear traces on said display, the improvement for correcting the range of the target returns comprising:

a $R_a$ counter,
a $R_c$ counter,
a random access memory (RAM),
means for resetting both counters upon receipt of a transmitter pulse,
means for continuously incrementing said $R_c$ counter at a linear rate,
a first multiplexer,
means coupling the output of both counters in parallel to the address input of said RAM through said first multiplexer,
means for incrementing said $R_a$ counter in accordance with the equation:
$R_c = (R_a^2 + 2R_aD)/(R_a + D(1+\cos \phi))$ where
$R_c$ = the correct range to the target;
$R_a$ = the apparent range to the target;
D = the distance from the bistatic passive radar to the host transmitter;
and $\phi$ = the angle between the extension of a line extending from the bistatic passive radar through the host transmitter and a line extending from the host transmitter to a selected target;

means for writing target returns into said RAM at the address specified by said $R_c$ counter; and means for reading target returns out of said RAM at the address specified by said $R_a$ counter and applying said target returns to said PPI display, whereby said target returns appear on the PPI display trace at their correct range with respect to said host transmitter.

2. The improvement defined in claim 1 and also including means for calculating the value of said equation iteratively in very short time intervals in comparison to the time duration of one linear trace on said PPI display.

3. The improvement defined in claim 2 wherein said very short time intervals are in the order of one micro second in duration.

4. The improvement defined in claim 1 wherein the means for solving said equation is implemented in the following form:

$$F(R_c, R_a) = D[2R_a - R_c(1 + \cos\phi)] + R_a^2 - R_a R_c = 0$$

5. The improvement defined in claim 4 wherein said $R_a$ counter is incremented in every time interval where the calculated value of $F(R_c, R_a)$ is negative.

6. The improvement defined in claim 4 wherein the means for solving said equation includes an adder, means for applying the value of $\cos\phi$ to one input of said adder and the value of 1.0 to the other input of said adder, a second multiplexer, means coupling the output of said adder to one input of said second multiplexer and the value 2.0 to the other input of said second multiplexer, means for switching said second multiplexer in synchronism with said first multiplexer, a first multiplexer/accumulator, means coupling the output of said first multiplexer to one input of said first multiplexer/accumulator and the output of said second multiplexer to the other input of said first multiplier/accumulator, a third multiplexer, means coupling the output of said first multiplexer to one input of said third multiplexer and the value of D to the other input of said third multiplexer, a fourth multiplexer, means coupling the output of said first multiplier/accumulator to one input of said fourth multiplexer, means coupling the output of said $R_a$ counter to the other input of said fourth multiplexer, means for switching said third and fourth multiplexers in synchronism, a second multiplier/accumulator, means coupling the output of said third multiplexer to one input of said second multiplier/accumulator and the output of said fourth multiplexer to the other input of said second multiplier/accumulator, and means for enabling said $R_a$ counter when the output of said second multiplier/accumulator is negative.

* * * * *